United States Patent [19]
Kennedy et al.

[11] Patent Number: 5,446,910
[45] Date of Patent: Aug. 29, 1995

[54] INTERRUPT CONTROLLER WITH AUTOMATIC DISTRIBUTION OF INTERRUPTS FOR A MULTIPLE PROCESSOR COMPUTER SYSTEM

[75] Inventors: Barry Kennedy, Santa Ana; Thomas W. Masters, Anaheim, both of Calif.

[73] Assignee: AST Reasearch, Inc., Irvine, Calif.

[21] Appl. No.: 111,281

[22] Filed: Aug. 24, 1993

Related U.S. Application Data

[63] Continuation of Ser. No. 721,693, Jun. 26, 1991, abandoned.

[51] Int. Cl.[6] .............................................. G06F 15/16
[52] U.S. Cl. ................................ 395/800; 395/200.01; 395/821; 395/728; 364/DIG. 1; 364/241.5; 364/241.2
[58] Field of Search ................ 395/800, 275, 325, 200, 395/375, 725

[56] References Cited

U.S. PATENT DOCUMENTS

| | | | |
|---|---|---|---|
| 5,099,414 | 3/1992 | Cole et al. | 395/200 |
| 5,101,497 | 3/1992 | Culley et al. | 395/725 |

OTHER PUBLICATIONS

Bursky, Dave, "More, Not Fewer, Chips Give PC's Flexible Options," *Electronic Design*, vol. 38, No. 10. pp. 95-98 (May 24, 1990).

Thorson, Mark, "S3 Introduces Flexible PC Chip Set Family," *Microprocessor Report*, vol. 4, No. 9, pp. 1, 9-11 (May 18, 1990).

Thorson, Mark, "ACI Bus Supports 486 Multiprocessing," *Microprocessor Report*, vol. 4, No. 11, pp. 9-11 (June 20, 1990).

Elmquist, Kells A., "Architectural and Design Perspectives In A Modular Multi-Microprocesssor, The DPS-1," *AFIPS Conference Proceedings*, pp. 587-593 (1979).

Satyanarayanan, M., *Multiprocessors: A Comparative Study*, pp. 148-150 (Prentice-Hall: 1980).

Bell, C. Gordon, et al., *Computer Structures: Readings and Examples*, pp. 447-455 (McGraw-Hill: 1971).

Rothlisberger, H., "A Standard Bus For Multiprocessor Architecture," *Euromicro*, pp. 23-34 (1977).

Muhlemann, K., "Towards Interrupt Assignment For Multiple Processors," *Euromicro*, pp. 157-156 (1980).

Moller-Nielsen, Peter, et al., "A Multi-Processor For Multi-Program Experiments," *Euromicro*, pp. 393-397 (1981).

Conte, G., et al., "TOMP80-A Multiprocessor Prototype," *Euromicro*, pp,. 401-410 (1981).

Palotasi, Andras, et al., "Architectural and Software

(List continued on next page.)

*Primary Examiner*—Alyssa H. Bowler
*Assistant Examiner*—L. Donaghue
*Attorney, Agent, or Firm*—Knobbe, Martens Olson & Bear

[57] ABSTRACT

An interrupt controller for use in a computer system capable of utilizing multiple processors provides a system for automatically distributing interrupts among processors installed in the system. More specifically, in the present invention, each processor has a corresponding interrupt controller. In one embodiment, one interrupt controller acts as a master to acknowledge interrupts at the system level and manage the distribution of interrupts, and any other interrupt controllers act as slave interrupt controllers. The master and slave interrupt controllers also provide an interface for a processor to interrupt another processor, to transfer an interrupt to another processor and to interrupt itself under local software control. Finally, the interrupt controllers provide different masking levels that allow a corresponding processor to temporarily mask interrupts assigned to the processor. The different masking levels also allow the interrupt controllers to accept two pending interrupts and then suppress interrupts to prevent losing any subsequent interrupts.

6 Claims, 4 Drawing Sheets

OTHER PUBLICATIONS

Considerations in VME-Bus Based Multiprocessor Systems," *Euromicro,* pp. 423–430 (1983).

Slater, Michael, "Corollary Unveils 486 Multiprocessor Cache Chips," *Microprocessor Report,* vol. 5, No. 15, pp. 1, 6–9 (Aug. 8, 1991).

Thorson, Mark, et al., "Compaq's Systempro: A First Step Toward Multiprocessing," *Microprocessor Report,* vol. 4, No. 8, pp. 6–9 (May 2, 1990).

Dowden, Tony, *Inside the EISA Computers,* pp. 33–37, 69–72 (Addison-Wesley: 1990).

Heath, Chet, et al., *The Micro Channel Architecture Handbook, pp. 1–13, 187–204, 269–290 (Simon & Schuster: 1990).*

*Peripherals 1990,* pp. 3–171 through 3–214 (Intel Corporation: 1989).

S3, Advanced Cache Controller Preliminary Information Sheet.

Advanced Cache Controller 86C401 (80486 Version), S3 Incorporated, pp. 1, 16–19 and 33A–33C.

Advanced Chip Interconnect, Rev. XO.12, S3 Incorporated, pp. 17–21 and 28, Feb. 26, 1990.

*Computer Design,* Jun. 1, 1990, Wilson, "New PC chip sets take on multiprocessing" pp. 34–36.

*Electronic Design,* Jun. 26, 1990, Bursky, "Enhanced 80 486 Bus Boosts Flexibility and Subsystems", pp. 35–36.

*EDN,* Jun. 21, 1990, Quinnell, "IC family allows modular design of multiprocessor personal computers" p. 140.

INTERRUPT CONTROLLER WITH AUTOMATIC DISTRIBUTION OF INTERRUPTS FOR A MULTIPLE PROCESSOR COMPUTER SYSTEM

This application is a continuation of application Ser. No. 07/721,693, filed Jun. 26, 1991 now abandoned.

BACKGROUND OF THE INVENTION

1. Field of the Invention

The present invention relates to the control and distribution of interrupts in a computer system. Specifically, the present invention involves interrupt controllers for automatically distributing interrupts among multiple processors installed in a multiprocessor computer system.

2. Description of the Related Art

The processing requirements of multi-user computer systems for personal and business needs continuously become more demanding. For instance, more complex application programs for use with local area networks are continuously being developed. Moreover, many multi-user systems provide access to more than one operating environment, such as UNIX and DOS, on the same system.

In general, the computers servicing these needs are single processor systems conforming to conventional architectures using a standard input/output I/O bus such as the Extended Industry Standard Architecture (EISA). New and more powerful systems constantly emerge. However, upgrading an old system generally requires investing in substantial hardware modifications or buying a new system.

As processing power demands increase, application software performance and operating systems would benefit from a multiprocessor interconnection architecture capable of providing parallel processing, high interactivity while retaining high batch performance.

One problem which hampers the efficient use of processing power in multiprocessor architectures is interrupt handling. It is not efficient to pass interrupts to all the processors on a common bus without some control over which processors handle which interrupts.

SUMMARY OF THE INVENTION

In order for a system to utilize the potential of multiple processors which can be removed or added to the system, it would be advantageous for interrupts to be automatically distributed among the processors, or to be received by a single processor and re-distributed by that processor to other processors.

In providing for more efficient interrupt control, it would be advantageous to provide a standard interface that controls interrupt services for each processor.

The present invention provides interrupt controllers which automatically distribute and control interrupt services between and among processors installed in a multiprocessor computer system. The controllers provide a standard interface for each processor that determines if the corresponding processor is enabled for selected interrupts. Further, in the present invention, one processor can receive interrupts and then distribute the interrupts to other processors. Moreover, a processor can interrupt itself through its interrupt controller.

One aspect of the present invention involves a multiprocessor computer with multiple central processing units installed in the computer. The computer has a system interrupt controller, and a local interrupt controller for each of the central processing units. The local interrupt controller provides at least two masking levels for interrupts. The local interrupt controller also has inter-processor interrupt control logic which provides interface and control logic for the central processing units in the computer to interrupt, or transfer an interrupt to, other central processing units in the computer. One of the local interrupt controllers may also be selected as a master interrupt controller to acknowledge an interrupt signalled from the system interrupt controller.

In one embodiment, each local interrupt controller further comprises control logic which detects when a selected interrupt is assigned to the corresponding central processing unit. The local interrupt controller also maintains a pending interrupt assigned to the corresponding central processing unit if the corresponding central processing unit has temporarily masked the interrupt through one of the interrupt masks.

Another aspect of the invention involves interface and control logic in each of the local interrupt controller which allows a central processing unit in the computer to interrupt itself.

Still another aspect of the invention involves the local interrupt controllers having an interrupt enable mask for selectively assigning interrupts to a corresponding central processing unit and also having an interrupt level mask for temporarily masking interrupts from a corresponding central processing unit. According to this aspect of the invention, the local interrupt controllers further have control logic which detects when a selected interrupt is assigned to the corresponding central processing unit, and which maintains a pending interrupt assigned to the corresponding central processing unit if the corresponding central processing unit has temporarily masked the interrupt through the interrupt level mask.

Finally, in another embodiment, the local interrupt controllers accept a first interrupt for the corresponding local processor, and also accept a second interrupt for the corresponding local processor and hold the first and second interrupts pending until the interrupts are acknowledged by the local processor.

DETAILED DESCRIPTION OF THE PREFERRED EMBODIMENT

Figure 1:
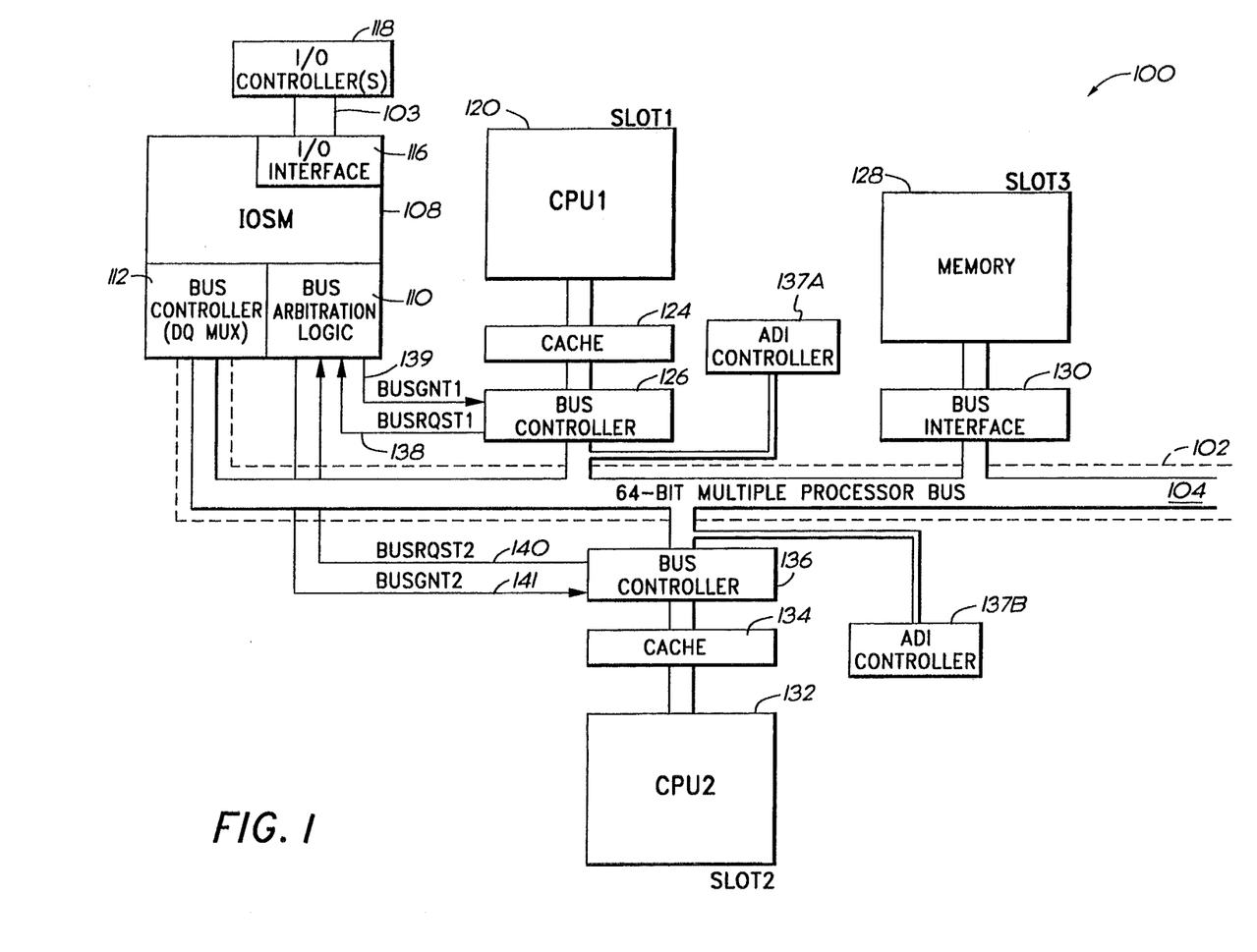
FIG. 1 is a block diagram of an exemplary multiprocessor interconnection system.

FIG. 1 is a block diagram of a multiprocessor interconnection system 100. The system 100 of the present embodiment comprises, in general, a backplane system bus 102 with a 64-bit multiple processor bus 104, an input/output (I/O) bus 103, which advantageously comprises a 32-bit Extended Industry Standard Architecture (EISA) bus in the present embodiment, an input/output services module (IOSM) 108 with a corresponding bus controller 112, a conventional I/O controller(s) 118, a first central processing unit (CPU1) 120 with a corresponding cache 124 and bus controller 126, a memory module 128 with a corresponding bus interface 130, and a second central processing unit (CPU2) 132 with a corresponding cache 134 and bus controller 136. Advantageously, each CPU has an associated automatic distribution of interrupts (ADI) controller 137 as further described herein.

Preferably, the I/O controller(s) 118 comprise(s) conventional EISA compatible controller(s) in the present embodiment. Advantageously, the 32-bit I/O bus 103 has 8 I/O connectors (e.g., conventional EISA I/O connectors) for the I/O controller(s) 118, and the backplane system bus 102 for the 64-bit system has eight system connectors along the 64-bit multiple processor bus 104. An additional connector designated to contain the IOSM 108 is located between the backplane system bus 102 and the I/O bus 103. The IOSM 108 interfaces the system bus 102 with the I/O bus 103.

Advantageously, the bus connectors for the 64-bit system are 240 pin METRAL connectors from DuPont, and the bus connector for the IOSM 108 is a 480 pin METRAL connector. The I/O bus connectors in the present embodiment are standard connectors from Burndy Corp., as well known in the art.

The backplane system bus 102 also comprises a number of conventional control signal lines, of which a few are relevant for discussion of the present invention. These are a cycle terminate (CTERM-) signal line (not shown) which carries a signal which indicates that data is valid on the bus, a system end of transaction (SEOT-) signal line (not shown) which carries a signal to master devices and the bus arbitration logic 110 indicating that the bus transaction is complete, a system memory cycle (SMEMCYC-) signal line (not shown) which carries a signal to differentiate memory operations from I/O operations, a system write (SWRITE-) signal line (not shown) which controls the direction of the data movement with memory and I/O bus transactions on the multiple processor bus 104, a system data (SDATA-) signal line (not shown) which carries a signal to differentiate data transactions from code transactions, a system bus address strobe (SADDS-) signal line (not shown) which carries a signal to indicate that address and transaction command signals are valid on the system bus, a system address line 20 mask (SA20M-) which acts as a mask bit for address line 20, as well known in the art, and a system bus transaction locked (SLOCK-) signal line (not shown) which carries a signal to indicate whether a bus transaction is a locked transaction. The bus arbitration logic 110 does not assign the next bus transaction to a different master if the SLOCK- signal line is active.

The IOSM

Figure 2:
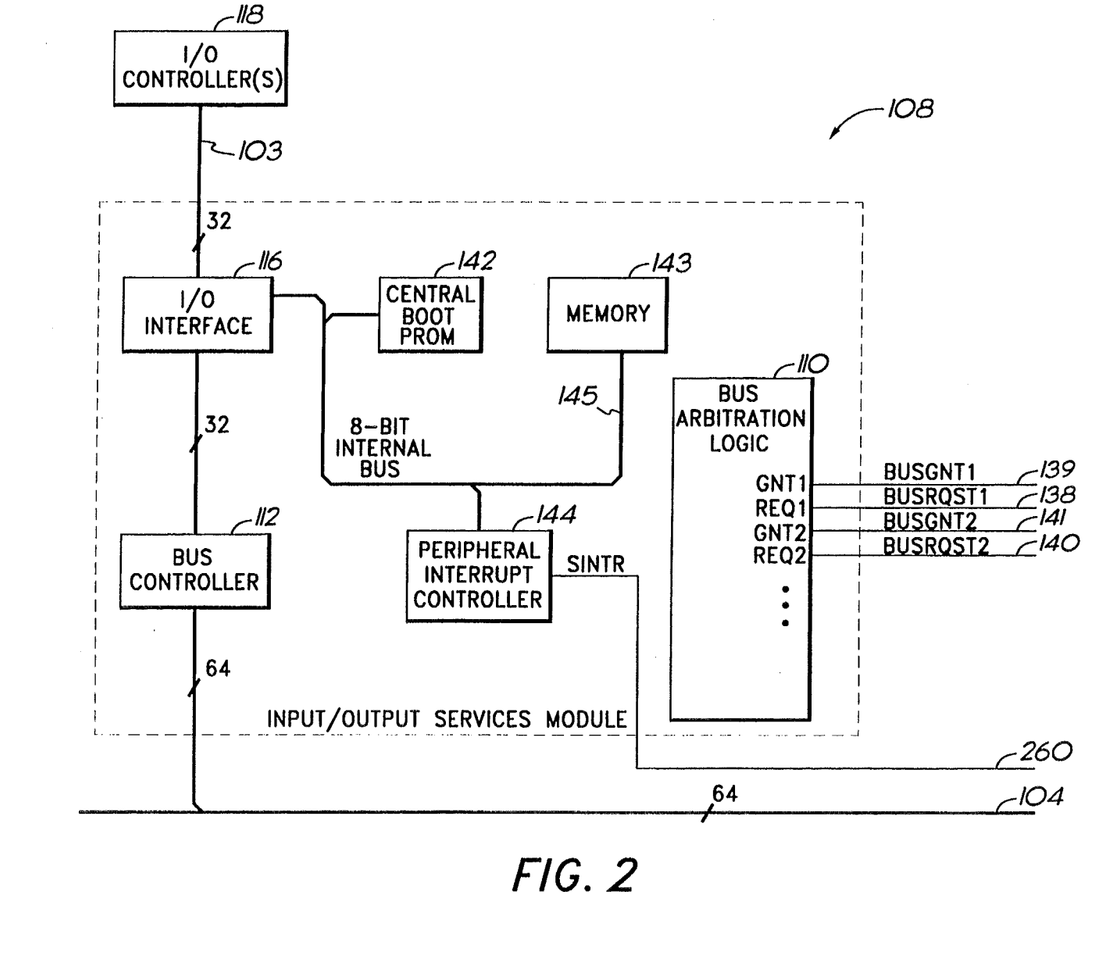
FIG. 2 is a more detailed block diagram of the input/output services module (IOSM) shown in FIG. 1.

The IOSM 108, as shown in more detail in FIG. 2, comprises bus arbitration logic 110, the bus controller 112 which interfaces with the 64-bit multiprocessor bus 104, an I/O interface 116, which interfaces with the I/O bus 103, a central boot programmable read-only-memory (PROM) 142 which contains power-on and self test (POST) code and the basic input/output system (BIOS), a memory 143, a conventional peripheral interrupt controller 144 (e.g., an INTEL 82357 or INTEL 82C59 compatible controller), and an internal 8-bit data bus 145 which interconnects the central boot PROM 142, the memory 143, the peripheral interrupt controller 144 and the I/O interface 116. Preferably, the internal 8-bit bus 145 also connects to a real time clock (not shown), a parallel port (not shown) a serial port (not shown), a floppy disk controller (not shown), a keyboard controller (not shown), and a system timer/counter (not shown), all well understood in the art.

The I/O interface 116 advantageously comprises a conventional EISA bus controller chip set as well understood in the art, and interfaces the conventional 32-bit I/O bus 103 and the internal 8-bit bus 145 with the 64-bit multiple processor bus 104 via the bus controller 112. The bus controller 112 interfaces with the 64-bit multiple processor bus 104 using a 32-bit to 64-bit multiplexer/demultiplexer (also known as the double word-/quad word multiplexer ('DQ MUX')). The DQ-MUX of the bus controller 112 breaks up 64-bit words into two 32-bit words, or combines two 32-bit words into 64-bit words, as well understood in the art. Advantageously, the bus controller 112 also includes a single level storage buffer (not shown).

In the present embodiment, the central boot PROM 142 preferably comprises a programmable read-only-memory with the POST and BIOS code for an INTEL 80486 or INTEL 80386 microprocessor. Accordingly, in the present embodiment, at least one CPU connected to the 64-bit bus 104 is, or emulates, an INTEL 80486 or INTEL 80386 microprocessor. Advantageously, the memory 143 comprises 8 Kbytes of complementary metal oxide semi-conductor (CMOS), static random access memory (SRAM).

The bus arbitration logic 110 accepts a number of individual bus requests from various devices which can become bus masters and provides a signal to grant the bus to the device requesting the bus, as well understood in the art. The bus arbitration logic 110 operates on a conventional scheme consisting of two signals carried by a BUSRQSTn signal line and a BUSGNTn signal line, one of each for every device which can become a bus master. The bus arbitration logic 110 communicates with the bus controllers for these operations. For example, the bus controller 126 for the CPU1 120 (FIG. 1) requests the bus by activating a BUSRQST1 signal line 138, and the bus arbitration logic 110 responds with an active signal on the a BUSGNT1 signal line 139 to grant the bus to the CPU1 120. Similarly, the bus controller 136 for the CPU2 132 requests the bus by activating a BUSRQST2 signal line 140, and the bus arbitration logic 110 grants the bus to the CPU2 132 by activating a BUSGNT2 signal line 141. The I/O interface 116 may also obtain control of the bus with corresponding BUSRQSTn and BUSGNTn signal lines (not shown) on behalf of an I/O controller 118 requesting to be a bus master.

Devices installed in the system bus 102 advantageously accept a 64-bit transfer even though the actual device may not utilize a full 64-bit data bus. For instance, if the CPU1 120 is based upon an INTEL 80486 which uses a 32-bit data bus, the bus controller 126 still accepts a 64-bit transfer from the bus 104 and places this data into the cache 124 which provides a 32-bit interface to the CPU1 120.

The CPU Modules

The CPU1 module 120 depicted in FIG. 1 could be any microprocessor chip set running at any speed. In the present embodiment, at least one CPU is preferably based upon an INTEL 80486 or 80386 compatible microprocessor. Accordingly, throughout the remainder of this description, references to the CPU1 120 assume an INTEL 80486 -based CPU with supporting resources which may include on-board crystal oscillators for independent timing. Other CPUs in the system need not be 80486-based as explained in more detail herein.

CPUs installed in the bus 104 may have independent asynchronous timing with respect to the bus 104.

In the present embodiment, the cache 124 for the CPU1 120 is a 256-Kbyte, two-way, set-associative, write-back cache with a 32-byte line size (4 bus cycles×8 bytes). The cache 124 interfaces the asynchronous CPU1 120 with the synchronous 64-bit bus 104 via the bus controller 126 which responds to signals on the BUSRQST1 signal line 138 and the BUSGNT1 signal line 139, as explained. The cache 124 supports writeback and the conventional Modified, Exclusive, Shared, Invalid (MESI) protocol to maintain cache coherency for the multiprocessor system 100. The cache 124 has a corresponding 64-bit interface (not shown) for the 64-bit bus 104 and a 32-bit interface (not shown) with the CPU1 120 if the CPU1 120 uses a 32-bit data bus. When the cache 124, or any other cache, generates a write-back cycle, it asserts an active low signal on a write back start (WBSTRT-) control line (not shown) to indicate the beginning of a write-back cycle from the cache, as well understood in the art.

The CPU2 132 is similar to the CPU1 120 except that the CPU2 132 need not be an 80486- or 80386-based CPU. The CPU2 132 also has a corresponding cache 134 and a bus controller 136 similar to those associated with CPU1 120. Further CPUs may also be added to the system and need not comprise INTEL 80486 - or 80386-based CPUs.

In the present embodiment, each CPU module advantageously has a corresponding automatic distribution of interrupts controller (ADI controller) 137. For instance, the CPU1 120 has the corresponding ADI controller 137A, and the CPU2 132 has the corresponding ADI controller 137B. Advantageously, other CPUs installed in the bus 102 also have corresponding ADI controllers. A CPU with a corresponding ADI controller 137 is hereinafter referred to as the "local processor" or "local CPU" of the corresponding ADI controller 137.

The Memory Modules

In the present embodiment, the memory module 128 accepts 64-bit transfers. However, memory modules need not be capable of accepting full 64-bit transfers. Advantageously, the memory 128 comprises 40-bit single-in-line memory modules (SIMMs) constructed from 1-Meg-by-4 or 4-Meg-by-4 dynamic random access memories (DRAMs). The Toshiba THM401020SG-80 is an exemplary 10-chip SIMM appropriate for use in the present system. The memory 128 supports 64 megabytes (per module) of RAM with 1-Meg-by-4 DRAM based SIMMs, or 256 megabytes (per module) with 4-Meg-by-4 DRAMbased SIMMs. The present embodiment of the interconnection system 100 allows up to one gigabyte of memory which can be provided by four 256 megabyte memory modules installed in the system. The memory module 128 also includes error correction code (ECC) capability for reliability. However, to eliminate the read-modify-write cycle caused by 32-bit operations on a 64-bit ECC memory, ECC is advantageously performed on a 32-bit basis instead of on a 64-bit basis.

The memory module 128 also comprises a DRAM controller (not shown) which provides conventional row address select (RAS), column address select (CAS), hidden refresh, address multiplexing, page mode and burst mode support. Accordingly, the DRAM controller comprises DRAM RAS/CAS address multiplexers, RAS/CAS generation logic, refresh counters, page-mode/page-hit logic and DRAM address drivers, all well understood in the art. In the present embodiment, the DRAM controller derives memory timing from an external clock signal carried on the system bus 102, and therefore, runs synchronously with the system bus 102.

In the present embodiment, the memory 128 also includes a corresponding bus interface 130 to the 64-bit bus. Advantageously, the interface 130 comprises an 8-level by 64-bit wide register. Parity generation and checking for the bus interface 130 is performed on a byte-by-byte basis for data entering and leaving the bus interface 130.

Interrupt Controllers

Figure 3:
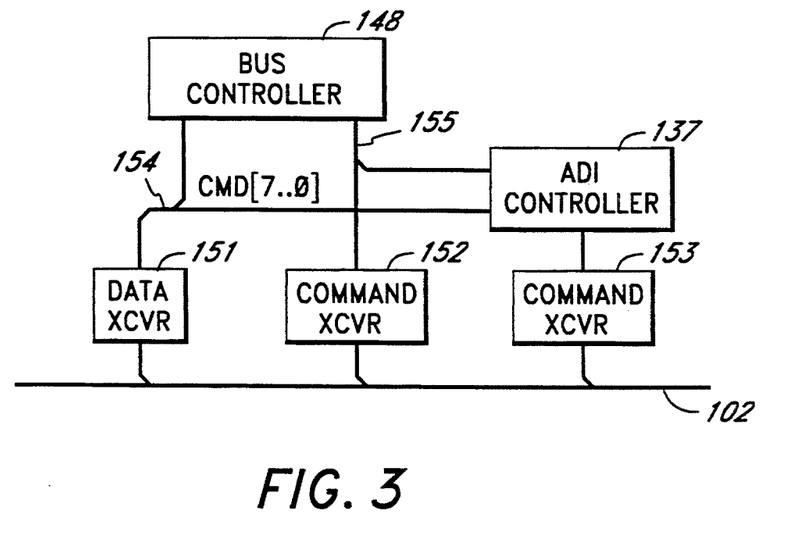
FIG. 3 is a block diagram illustrating interconnections between a cache controller, an interrupt controller and a system bus.

FIG. 3 illustrates a block diagram of the connections between a bus controller 148, an ADI controller 137, and the backplane system bus 102 with a data transceiver (XCVR) 151, and command transceivers 152 and 153. The bus controller 148 and the ADI controller 137 connect to the system bus 102 with, preferably, an eight-bit data bus CMD[7..0] 154 buffered by the data XCVR 151. The bus controller 148 and the ADI controller 137 also connect to the system bus 102 with a command bus 155 buffered by the command XCVR 152. The ADI controller 137 also connects directly to the system bus 102 via the command transceiver 153.

Figure 4:
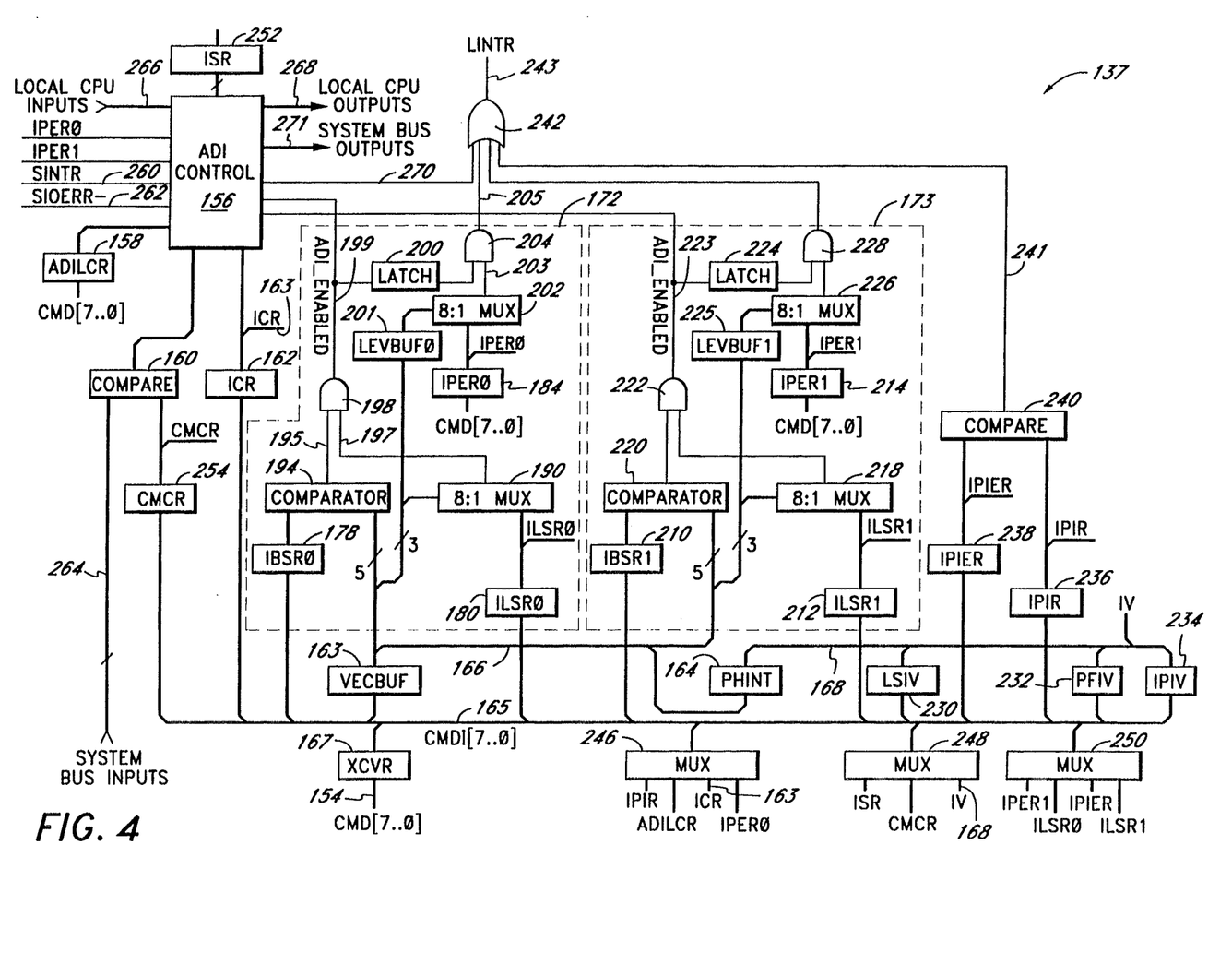
FIG. 4 is a block diagram of an interrupt controller according to one embodiment of the present invention.

FIG. 4 illustrates a block diagram of a preferred embodiment of an ADI controller 137 for use in a multiprocessor system 100 according to the present invention. The ADI controller 137 comprises automatic distribution of interrupts control logic (ADI control) 156, an automatic distribution of interrupts local control register (ADILCR) 158, a compare circuit 160, an interrupt control register (ICR) 162, an interrupt vector buffer register (VECBUF) 163, a pending hardware interrupt register (PHINT) 164. THE VECBUF register 163 connects at its inputs to a CMDI[7..0] data bus 165, and at its outputs to a vector buffer bus 166. The CMDI[7..0] bus 165 connects to the CMD[7..0] data bus 154 via a transceiver 167. The PHINT register 164 connects to the vector buffer bus 166 at its input and to an interrupt vector bus (IV) 168 at its outputs.

An interrupt generation circuit 172 comprises an interrupt block select register 0 (IBSR0) 178, an interrupt level select register 0 (ILSR0) 180, an interrupt priority enable register 0 (IPER0) 184, a multiplexer 190, a comparator 194, a signal line 195, a signal line 197, an AND gate 198, an ADI_ENABLED signal line 199, a latch 200, a buffer (LEVBUF0) 201, a multiplexer 202, a signal line 203, an AND gate 204, and a signal line 205. An interrupt generation circuit 173 is similar to the interrupt generation circuit 172 and comprises an interrupt block select register 1 (IBSR1) 210, an interrupt level select register 1 (ILSR1) 212, an interrupt priority enable register 1 (IPER1) 214, a multiplexer 218, a comparator 220, an AND gate 222, an ADI_ENABLED signal line 223, a latch 224, a buffer (LEVBUF1) 225, a multiplexer 226, and an AND gate 228.

The ADI controller 137 further comprises a local software (S/W) interrupt vector register (LSIV) 230, a power fail interrupt vector register (PFIV) 232, an inter-processor interrupt vector register (IPIV) 234, an inter-processor interrupt register (IPIR) 236, an inter-processor interrupt enable register (IPIER) 238, a compare circuit 240, a signal line 241, a OR gate 242, three multiplexers 246, 248 and 250, an interrupt status register 252, and a CPU mode control register (CMCR) 254.

Each ADI controller 137 responds to signals on a common system interrupt (SINTR) signal line 260 from the peripheral interrupt controller 144 on the IOSM 108

(FIG. 2), a common system I/O error interrupt (SIOERR-) signal line 262, and additional system bus inputs carried on system bus inputs signal lines 264. The SINTR signal line 260 is wired in an open-collector configuration. Advantageously, the system bus inputs signal lines 264 comprise signal lines such as the system address line 20 mask (SA20M-) signal line and a system CPU reset (SCPURST-) signal line, both well understood in the art.

The ADI controller 137 further responds to signals from local inputs on local CPU input signal lines 266. The local CPU inputs on the signal lines 266 advantageously comprise signals such as a write/read (W/R) signal line, a data control (DC) signal line, a memory I/O (MI/O) signal line, a LOCK signal line, and an address strobe (ADS) signal line, all well understood in the art.

Each ADI controller 137 provides a signal on a local interrupt (LINTR) signal line 243 which connects to the interrupt pin on the local CPU. The ADI controller 137 further provides a plurality of signals to the local CPU on local CPU outputs signal lines 268 and a plurality of signals to the system bus 102 on system bus outputs signal lines 271. The signals on local CPU outputs signal lines 268 advantageously comprise outputs such as a local non-maskable interrupt (LNMI-) signal line, a local gate A20 (LA20-) signal line, a local ready (LRDY-) signal line, and a local CPU reset (LCPURST-) signal line, as well understood in the art.

The system bus outputs on signal lines 271 comprise outputs such as the system bus address strobe (SADDS-) signal line, the system write (SWRITE-) signal line, the system data (SDATA-) signal line, the system memory cycle (SMEMCYC-) signal line, the system lock (SLOCK-) signal line, the cycle terminated (CTERM-) signal line, and the system end of transaction (SEOT-) signal line. The SADDS-, SWRITE-, SDATA-, SMEMCYC-, and SLOCK- signal lines function similarly to the CPU inputs (ADS, W/R, DC, MI/O and LOCK, respectively) except at the system level.

A description of the function of the individual bits in some of the registers is now provided in more detail to facilitate an understanding of the system. Advantageously, the registers are memory or I/O mapped to enhance accessibility.

In the present embodiment, the ICR 162 comprises an 8-bit read/write register which is initially loaded for each CPU during initialization operations. The bit assignments of the ICR 162 for the present embodiment are as follows:

Bit 7—this is the interrupt master bit. When this bit is set to a 0, the corresponding ADI controller 137 is not the master ADI controller and only acts as an interrupt slave controller. When this bit is set to a 1, the corresponding ADI controller 137 is designated as the interrupt master and acknowledges (at the system level) interrupts which are requested by the peripheral interrupt controller 144 on the IOSM 108. In the present embodiment, only one ADI controller is designated to be the master at any given time.

Bits 6, 5, 4—reserved.

Bit 3—this bit allows an interrupt request from the peripheral interrupt controller 144 on the IOSM 108 to bypass the ADI controller 137. If this bit is set to a 0, then the interrupt request from the peripheral interrupt controller 144 on the IOSM 108 is passed directly to the corresponding CPU and the ADI controller 137 is disabled (also referred to as "DOS mode" herein). If this bit is set to a 1, then the interrupt request is first processed by the corresponding ADI controller 137.

Bit 2—reserved.

Bit 1—this is the hardware interrupts disable bit. This bit controls whether the ADI controller 137 latches interrupt vectors during a hardware interrupt acknowledge cycle. If this bit is set to a 0, the ADI controller 137 is enabled to latch interrupt vectors. If this bit is set to a 1, then the ADI controller 137 does not latch interrupt vectors.

Bit 0—this bit controls the operation of the IPIR 236. If this bit is set to a 1, write operations performed by the local CPU to the IPIR 236 are ignored by this ADI controller 137. If this bit is set to a 0, write operations to the IPIR 236 are accepted.

The ADILCR 158 of the present embodiment is a read/write register initially loaded on a per CPU module basis at initialization. In the present embodiment, this register comprises 8 bits as follows:

Bit 7—this bit is the system I/O error mask. If this bit is set to a 0, system I/O errors signalled on the SIOERR- signal line 262 are allowed to propagate to a conventional local non-maskable interrupt (LNMI-) connection of the local CPU. If this bit is set to a 1, system I/O errors are masked from propagating to the local CPU LNMI- signal line. However, when set to a 1, this bit does not mask lower priority interrupts.

Bit 6—this bit is the bus timeout error mask. If this bit is cleared, bus timeout errors are not masked and result in a local NMI on the LNMI- signal line. If this bit is set, but timeout errors are masked from causing a local NMI. This bit does not mask lower priority interrupts.

Bit 5—this bit is the power-fail interrupt mask. If this bit is set to a 0, a power-fail interrupt may be transmitted to the LINTR signal line 243. If this bit is set to a 1, the power-fail interrupt is prevented from propagating to the LINTR signal line 243. In addition, inter-processor interrupts, local software interrupts and all hardware interrupts are masked by this bit when it is set.

Bit 4—this bit is used to restore interrupt enable levels. A zero in this bit represents that interrupt level enables are restored (i.e., bits 2–0 of the ISR 252 are cleared). A 1 in this bit indicates that interrupt enable levels have been altered. This bit is set by hardware when an interrupt is acknowledged or an NMI, other than system I/O errors, occurs.

Bit 3—this bit is the local software interrupt mask. If this bit is set to a 0, a local interrupt is transmitted via the LINTR signal line 243 to the local CPU. If this bit is set to a 1, any local software interrupt is masked from propagating to the LINTR signal line 243.

Bit 2—this is the non-maskable interrupt (NMI) bit. Setting this bit to a 1 internally (locally) generates an NMI to the local CPU. The ADI controller generates a 2-clock NMI pulse to the local CPU and then clears this bit to a 0. A 0 in this bit indicates that the local NMI is inactive.

Bit 1—this is the internal (local) power-fail interrupt bit. Setting this bit to a 1 generates an internal power-fail interrupt (if power-fail interrupts are not masked with bit 5). The ADI controller 137 automatically resets this bit when the interrupt is acknowledged. A 0 in this bit represents that the internal power-fail interrupt is inactive.

Bit 0—this bit is the local software interrupt bit. Setting this bit to a 1 results in an active signal on the LINTR signal line 243 and generates a local software interrupt (if local software interrupts are not masked by bit 3). The ADI controller 137 automatically resets this bit to a 0 when the interrupt is acknowledged by the local CPU. Setting this bit does not affect the status of an unacknowledged inter-processor interrupt from the local CPU or an external source.

Advantageously, the ISR 252 is an 8-bit read only register accessed on a per CPU basis. The bits in this register are set by hardware logic in the ADI control 156 when the conditions specified below are detected by the ADI control 156:

Bit 7—this bit is set to a 1 if a system I/O error interrupt is pending (i.e. the interrupt has been signalled but not yet acknowledged by the local CPU). This bit is the logical inverted value of the signal on the SIOERR- signal line 262 and is also not affected by the I/O error mask bit (bit 7 of the ADILCR 158).

Bit 6—this bit is set to a 1 if a power-fail interrupt is pending but has not been acknowledged by the local CPU. This bit is reset on the clock cycle following the transfer of the interrupt vector to the local CPU.

Bit 5—this bit is set to a 1 if an inter-processor interrupt is pending but has not been acknowledged by the local CPU. This bit is reset on the clock cycle following the transfer of the interrupt vector to the local CPU.

Bit 4—this bit is set to a 1 if a hardware interrupt is pending but has not yet been acknowledged by the local CPU. This bit is reset on the clock cycle following the transfer of the interrupt vector to the local CPU.

Bit 3—this bit is set to a 1 if a local software interrupt is pending but has not yet been acknowledged by the local CPU. This bit is reset on the clock cycle following the transfer of the interrupt vector to the local CPU.

Bits 2-0—these bits are encoded to represent the reason for an NMI which has been signalled as follows:

| Bit 2 | Bit 1 | Bit 0 | NMI Reason |
|---|---|---|---|
| 0 | 0 | 0 | no NMI |
| 0 | 0 | 1 | memory parity error |
| 0 | 1 | 0 | bus parity error |
| 0 | 1 | 1 | bus timeout |
| 1 | 0 | 0 | S/W generated NMI |
| 1 | 0 | 1 | CPU parity error |
| 1 | 1 | 0 | reserved |
| 1 | 1 | 1 | reserved |

Bits 7-3 are reset by hardware when the corresponding interrupt is acknowledged. Bits 2-0 are reset when bit 4 of the ADILCR 158 (the restore interrupt enable levels bit) is reset.

The CMCR 254 is advantageously an 8-bit read/write register, with bit assignments in the present embodiment as follows:

Bit 7—6—reserved.

Bit 5—this bit is a CPU reset mask. If this bit is set to a 0, a CPU reset signal from the system on an SCPURST- signal line among the signal lines 264 passes to the local CPU on an LCPURST- signal line among the local CPU outputs signal lines 268. If this bit is set to a 1, the CPU reset signals from the system are masked from the local CPU.

Bit 4—this bit is the local address line 20 mask. If this bit is set to a 0, the signals on a system bus address line 20 mask (SA20M-) among signal lines 264 are transmitted to the local processor's address line 20 mask (LA20M-) among the local CPU outputs signal lines 268. If this bit is set to a 1, the signals on the SA20M- signal line are masked from propagating to the local CPU LA20M- signal line. This can be used during switches between real and protected mode operation, as well understood in the art.

Bit 3—2—reserved.

Bit 1—this is the local reset bit. If this bit is set to a 1, the ADI control 156 generates an sixteen-clock signal for a local CPU reset on the LCPURST signal line which is among the local CPU outputs signal lines 268.

Bit 0—reserved.

The operation of masking address line A20 for real and protected mode operation is well understood in the art for single processor systems. The multiprocessor system adds the extra level of control from bit 4 in the CMCR 254 such that address line 20 can either be controlled from the system SA20M- address line or masked from it. Accordingly, separate processors need not operate in the same mode as other processors.

The VECBUF 163 latches incoming interrupt vectors transmitted during a system level interrupt acknowledge cycle. This contents of this register are moved to the PHINT register 164 unless the PHINT register 164 already contains the vector of a previous interrupt, as further explained herein.

The PHINT register 164 is a read-only register in the present embodiment which latches interrupt vectors held in the VECBUF 163 which are assigned to the local CPU, as further explained below. This is an 8-bit register which is reset to 0 once the interrupt is acknowledged by the local CPU.

Interrupts are either selectively assigned to the interrupt controllers 137 by the operating system so that when interrupts are signalled, they are automatically distributed to the appropriate processors, or the interrupts can be sent to a single processor for processing, or the interrupts can be sent to a single processor that re-distributes the interrupts to other processors under software control.

For automatic distribution of interrupts, each of the interrupt generation circuits 172 and 173 utilizes the three registers described below to store information about, and determine, which interrupts have been assigned to the ADI controller 137.

The IBSR0 register 178 is a 5-bit read/write register accessed on a per CPU module basis. The 5 bits of this register are loaded with a value that selects which of two potential interrupt blocks are enabled for the interrupt generation circuit 172 (e.g., in one embodiment, for conventional DOS compatibility, the IBSR0 178 may be initialized to correspond to the upper 5 bits of interrupt vectors 08–0F hex or 70–77 hex, which are the conventional DOS interrupt vectors well understood in the art). The contents of this register are compared with the upper 5 bits of the VECBUF register 163 as explained herein.

The ILSR0 register 180 is an 8-bit read/write register loaded on a per CPU module basis. The bits in this register correspond to the individual interrupts which are enabled for the interrupt generation circuit 172. In other words, this register acts to enable or mask individual interrupts for the interrupt generation circuit 172. The contents of the ILSR0 register 180 are used to enable interrupts selected by the lower 3 bits of the VECBUF register 163 through multiplexer 190, as further explained herein.

The IPER0 184 is an 8-bit read/write register which is loaded on a per CPU module basis. This register contains an interrupt priority mask for the interrupts enabled for the corresponding ADI controller 137. Generally, the bits in this register correspond to the bits in the ILSR0 register 180. However, providing this register independent from the ILSR0 register 180 allows the local CPU to temporarily mask, or alter the priority of, its assigned interrupts without re-assigning the interrupts to another CPU. If any of the bits of this register are cleared (masked), all lower priority interrupts are also masked.

The interrupt generation circuit 173 has similar registers, IBSR1 210, ILSR1 212 and IPER1 214. These registers perform functions similar to those previously discussed for interrupt generation circuit 172, but may be loaded with different values to enable different interrupts. For example, for conventional DOS compatibility, if the IBSR0 178 is initialized to correspond to the upper 5 bits of the conventional DOS vectors 08–0F hex, the IBSR1 210 may be initialized to correspond to the upper 5 bits of the conventional DOS interrupt vectors 70–77 hex.

The LEVBUF0 register 201 and the LEVBUF1 register 225 are three bit registers which latch the lower three bits of an interrupt vector when it is active on the vector buffer bus 166, as further explained herein.

The LSIV register 230 of the present embodiment is a read/write 8-bit register which is designated to contain the interrupt vector for the local CPU when the local CPU performs an interrupt acknowledge cycle for a local software generated interrupt (bit 0 of the ADILCR 158) that has not been masked by bit 3 of the ADILCR 158. Local software interrupts are masked from the local CPU if any hardware interrupt is masked. The LSIV register 230 can be loaded on a per CPU module basis with the interrupt vector for the local software interrupt service routine. Bit 0 of the ADILCR 158 is automatically reset by hardware when the local CPU acknowledges the local software interrupt.

The PFIV register 232 of the present embodiment is a read/write, 8-bit register designated to contain the interrupt vector for the local CPU when the local CPU performs an interrupt acknowledge cycle responding to a power-fail interrupt. The PFIV register 232 is loaded on a per CPU module basis with the interrupt vector for the power-fail interrupt service routine. A power-fail interrupt is generated whenever the power in the system falls below a predetermined level, if the power-fail interrupt has not been masked through bit 5 of the ADILCR 158. For diagnostic purposes, the power-fail interrupt function is tested by the use of bit 1 of the ADILCR 158 to generate a power-fail interrupt (e.g., setting bit 1 to a 1).

The IPIV register 234 of the present embodiment is a read/write, 8-bit register designated to contain the interrupt vector for the local CPU when the local CPU performs an interrupt acknowledge cycle to an inter-processor interrupt. The IPIV register 234 is loaded on a per CPU module basis or globally with the interrupt vector for the inter-processor interrupt service routine.

The IPIR register 236 is an 8-bit, preferably write-only, register with a memory mapped location such that all ADI controllers 137 can be accessed simultaneously. The IPIR 236 allows an ADI controller 137 to pass interrupts to selected, or to all, processors in the system. In the present embodiment, the 8 bits correspond to eight potential processor groups. Each processor is assigned a bit via the IPIER 238, and inter-processor interrupts are signalled to the local CPU if any bit set in the IPIR 236 matches a corresponding bit set in the IPIER 238. The ADI controller 137 automatically resets the IPIR register 236 during an acknowledge sequence to an inter-processor interrupt.

The IPIER 238 is an 8-bit, read/write register which provides a mask for the IPIR 236 contents. This register is loaded, advantageously on a per cpu module basis, with the bit assignment that determines which inter-processor interrupts generate an interrupt for the local processor. The contents of this register are compared to the contents of the IPIR 236 during an inter-processor interrupt to determine if any bit (or bits) set in the IPIR 236 correspond to any bit set in the IPIER 236 for the corresponding CPU. If a match occurs between any corresponding bits set in the IPIR 236 and bits set in the IPIER 238, then an inter-processor interrupt is generated for the local CPU.

The outputs of each of the readable registers are connected to one of the multiplexers (MUXs) 246, 248 or 250 as seen in FIG. 4. For instance, the outputs of the ICR 162 are connected to the MUX 246 with ICR signal lines 163, and the outputs of the interrupt vector registers, which are selected depending on the type of interrupt, connect to the MUX 248 via the IV bus 168. During a read operation, the ADI controller 137 selects the appropriate input as addressed by the local CPU from the MUXs 246, 248 or 250 for propagation to the CMDI[7..0] data bus 165. The signals on the CMDI[7..0] data bus 165 propagate through the XCVR 167 onto the CMD[7..0] data bus 154, and are read from this bus into the cache for the local CPU by the bus controller 148 (FIG. 3) for the local CPU.

Advantageously, the ADI controller 137 has various modes of operation. In one mode, interrupts are automatically distributed under hardware control by assigning interrupts among the ADI controllers 137. In a second mode of operation, interrupts are distributed under software control. In the present embodiment, the ADI controllers 137 are configured for either mode by setting appropriate bits in the ICR 162 as further explained herein.

Automatically Distributed Hardware Interrupts

In general, for automatic distribution of interrupts, the SINTR signal line 260 from the peripheral interrupt controller on the IOSM 108 is connected to each ADI controller 137 installed in the system in an open collector configuration. When the system has more than one CPU module installed, the ADI controller 137 with bit 7 of the ICR 162 (the master bit) set to 1 is the master ADI controller. Preferably, the initialization firmware/software selects the master ADI controller 137. Advantageously, this selection may be changed under software control by the operating system, and software is responsible for insuring that only one master controller is designated at any given time.

When a hardware interrupt is detected by the peripheral interrupt controller 144 on the IOSM 108, as well understood in the art, the peripheral interrupt controller 144 activates the SINTR signal line 260. If interrupts are enabled, the master interrupt controller acknowledges the interrupt request with a system level interrupt acknowledge sequence, causing two interrupt acknowledge cycles to be generated. System level interrupt acknowledge cycles are generated by simultaneously activating the SWRITE- signal line, the SDATA- signal line and the SMEMCYC- signal lines. These signal lines are decoded to generate an interrupt acknowledge to the peripheral interrupt controller 144. During the second interrupt acknowledge cycle, the peripheral interrupt controller 144 on the IOSM 108 places an interrupt vector (right justified) on the system bus 102. The vector propagates through the data transceiver 151 (FIG. 3) to the CMD[7..0] bus 154 and through the transceiver 167 to the CMDI[7..0] bus 165. The ADI controllers 137 in the system, with interrupt vector latching enabled (bit 1 of the ICR 162), capture the interrupt vector in the corresponding VECBUF registers 163. The ADI controllers 137 then process this vector with the two interrupt generation circuits 172 and 173.

In general, the interrupt generation circuits 172 and 173 determine if the interrupt signalled is an interrupt assigned to the local CPU of the corresponding ADI controller 137. The interrupt generation circuits 172 and 173 function similarly, and therefore, the function is more specifically explained in reference to interrupt generation circuit 172.

The interrupt generation circuit 172 compares the contents of the 5-bit IBSR0 register 178 to the upper 5 bits of the interrupt vector stored in the VECBUF register 163. If all 5 bits match, then the comparator 194 produces an active signal on the signal line 195. The lower 3 bits of the interrupt vector held in the VECBUF register 163 are an encoded value representing potentially 8 interrupts (interrupt levels 0-7). These lower 3 bits are used as select inputs to the 8:1 multiplexer 190 which outputs the corresponding bit from the ILSR0 register 180 on the signal line 197. If the bit from the ILSR0 180 selected for propagation through the multiplexer 190 is set, then the signal line 197 becomes active. The active signals on the signal line 197 and on the signal line 195 combine to activate the AND gate 198 which produces an active signal on the ADI_ENABLED signal line 199 to indicate whether or not the ADI controller 137 is enabled for the particular interrupt. If the interrupt is enabled (assigned to the local processor), then the ADI controller 137 loads the PHINT register 164 with the contents of the VECBUF register 163, and loads LEVBUF0 201 and LEVBUF1 225 with the lower three bits of the VECBUF register 163. The active signal on the ADI_ENABLED signal line 199 is maintained by the latch 200 until the interrupt is acknowledged. If the PHINT register 164 is already holding a vector, then the ADI controller is in a 'busy' state, and postpones loading the PHINT 164 from the VECBUF register 163, and drives the SINTR signal line 260 inactive to prevent subsequent interrupts from being signalled by the peripheral interrupt controller 144. This state persists until the local CPU acknowledges the interrupt and the interrupt vector in PHINT 164 is transferred to the CPU. The ADI control 156 monitors whether interrupt vectors are stored in the PHINT register 164 and the VECBUF register 163 with a state machine that keeps track of vectors received in the VECBUF register 163, vectors latched into the PHINT 164, and interrupts acknowledged by the local processor.

By using the IPER0 register 184 (and the IPER1 register 214), each local CPU can raise or lower the priority levels of the interrupts it wishes to receive without the system losing any interrupts. Therefore, before an interrupt is generated for the local CPU, the 8:1 multiplexer 202 is used to determine if the local CPU has temporarily masked the interrupt level in the IPER0 184.

The three bits held in the LEVBUF0 register 201 (which match the least significant three bits pending interrupt vector) are used as select inputs to the 8:1 multiplexer 202 which outputs the corresponding enable bit from the IPER0 register 184 on the signal line 203.

If the interrupt has not been masked, then the 8:1 multiplexer 202 produces an active signal on the signal line 203 which combines with the active signal from the ADI_ENABLED signal line 199 maintained by the latch 200 to activate the AND gate 204. An active signal from the AND gate 204 on the signal line 205 activates the OR gate 242 and results in an active signal on the LINTR signal line 243 which is connected to the interrupt pin of the local CPU.

The local CPU acknowledges the interrupt, according to its convention, to the ADI controller 137 (e.g. if the processor is an INTEL 80386 or 80486 processor, the processor activates the conventional W/R, D/C and MI/O signal lines, as well known in the art, which are among the local CPU inputs 266 in the present embodiment). The ADI controller 137 then gates the vector in the PHINT 164 onto the IV bus 168 and selects the signals on the IV bus 168 for propagation through the multiplexer 248. The signals from the multiplexer 248 propagate through the transceiver 167 and onto the CMD[7..0] bus 154. Then the ADI controller 137 returns a conventional local ready signal sequence on the local ready (LRDY-) signal line (not shown). For instance if the local processor is an INTEL 80386 or 80486, the ADI controller 137 generates a locked pair of ready signals, as well known in the art. The second ready signal in the locked pair indicates to the local processor that a valid interrupt vector is on the local CPU's bus. Thus, when the ADI controller issues the second ready signal which is detected by the local processor, the local processor accepts the interrupt vector from the CMD[7..0] bus 154 via the local processor's bus controller 148. No signals for the local interrupt acknowledge cycle from the local CPU pass to the system bus 102.

The master interrupt controller is responsible for providing the system level acknowledge sequences as previously explained. The resulting sequence of operation if the interrupt is enabled in the IPER0 184 is as follows:

The peripheral controller 144 on the IOSM 108 signals an interrupt request by activating the SINTR signal line 260.

The master ADI controller acknowledges the interrupt request to the system, and the peripheral interrupt controller 144 removes the active signal on the SINTR signal line 260. The master ADI controller is also free to acknowledge subsequent interrupts.

During the acknowledge cycle from the master ADI controller, each ADI controller 137 captures the interrupt vector in its corresponding VECBUF register 163.

If any of the ADI controllers 137 already have a vector stored in the PHINT register 164, and the corresponding ADI controller 137 is assigned to handle this interrupt vector, the ADI controller(s) 137 with a pending vector in the PHINT register 164 drive the SINTR signal 260 inactive to prevent further interrupts at this time.

The ADI controller 137 for each CPU module checks to see if it is enabled for the interrupt by monitoring its corresponding ADI_ENABLED signal lines 199 and 223. The enabled ADI controller(s) 137 signals its corresponding local CPU by enabling the LINTR signal line 243. If the PHINT register 164 is full, then the ADI controller continues to drive the SINTR signal line 260 inactive to prevent subsequent interrupts from being detected by the master ADI controller until the local CPU acknowledges the interrupt in the PHINT 164. All other ADI controllers 137 release the SINTR signal line 260 so that it may be driven active again for system interrupt requests.

The contents of the VECBUF 163 are transferred to the PHINT 164 when it is empty, the least significant three bits are transferred to the LEVBUF0 201 and the latches 200 maintain the actual signal on the ADI_ENABLED signal line 199.

The local CPU acknowledges the interrupt, and the vector that was held in the PHINT register 164 is read by the local CPU to determine which interrupt routine to execute.

As previously mentioned, by using the IPER0 184 and the IPER1 214, each processor can raise or lower the priority of interrupt levels it will accept without the system losing any interrupts. If the ADI controller 137 receives an interrupt that is assigned to the local CPU (as determined by comparing the vector to the contents of the IBSR0 178 (or IBSR1 210) and the ILSR0 180 (or ILSR1 212) as previously explained), but the local CPU has temporarily disabled the interrupt with the IPER0 184 (or IPER1 214), no interrupt is signalled to the local CPU on the LINTR signal line 243 because the bit selected for propagation through the multiplexer 202 is not set. Accordingly, the ADI controller 137 holds the interrupt pending in the PHINT 164 (with the least significant three bits also held in the LEVBUF0 201) until the local CPU re-enables the interrupt by restoring interrupt priority levels in the IPER0 184 or IPER1 214. While the interrupt is held pending, the ADI controller 137 may accept one more interrupt and latch the interrupt in the VECBUF 163. If the ADI controller 137 receives another interrupt while an interrupt is pending with a vector held in the PHINT register 164, the ADI controller 137 suspends further interrupts by driving the SINTR signal line 260 inactive, as previously explained. The master ADI controller cannot detect further interrupts until the ADI controller 137 releases the SINTR signal line 260.

For example, if an ADI controller 137 receives an interrupt that is assigned to the local CPU, but the local CPU has disabled further interrupts with the IPER0 184 (or the IPER1 214) and a vector is already contained in PHINT 164, and another interrupt has been signalled and the vector is latched in the VECBUF register 163, the ADI controller 137 suspends further interrupts by driving the SINTR signal line 260 inactive. This condition continues and additional interrupts are held off until interrupts are re-enabled in the IPER0 184 (or IPER1 214), and the interrupt in the PHINT register 164 passes to, and is acknowledged by, the local CPU. Once the vector pending in the PHINT 164 is accepted by the local CPU, the vector in the VECBUF 163 is latched into the PHINT 164, and the least significant three bits are latched into the LEVBUF0 102 (and the LEVBUF1 225). The SINTR signal line 260 is then released to allow the master ADI controller to acknowledge further interrupts from the peripheral interrupt controller 144.

The ADI control 156 determines if the interrupt is assigned to the local CPU by monitoring the ADI_ENABLED signal line 199 for the interrupt generation circuit 172 (and the ADI_ENABLED signal line 223 for the interrupt generation circuit 173). The ADI control 156 determines if the local CPU has temporarily masked the interrupt by examining the contents of the IPER0 184 (and the IPER1 214). The resultant sequence for automatically distributing interrupts when an interrupt is requested to a busy ADI controller 137 is as follows:

The peripheral interrupt controller 144 on the IOSM 108 signals an interrupt request by activating the SINTR signal line 260.

The master ADI controller acknowledges the interrupt request, and the peripheral interrupt controller 144 may signal further interrupts.

During the acknowledge cycle from the master ADI controller, the interrupt vector is captured by all ADI controllers 137 in the corresponding VECBUF registers 163.

If any of the ADI controllers 137 already have a vector stored in the PHINT register 164, these ADI controllers 137 immediately drive the SINTR signal line 260 inactive to prevent the master ADI controller from acknowledging further interrupts.

The ADI controller 137 on each CPU module checks to see if it is enabled for this vector as previously explained. If the interrupt is assigned to an ADI controller 137 with a vector pending in the PHINT register 164, then the SINTR signal line 260 is held inactive until the local CPU restores interrupt levels in the IPER0 184 (and IPER1 214) and the pending interrupt is acknowledged by the local CPU. While the SINTR signal line is inactive, the master ADI controller cannot detect or acknowledge subsequent interrupts from the peripheral interrupt controller 144.

Once the interrupt levels are restored, an interrupt is signalled to the local CPU, the local CPU acknowledges the interrupt and reads the interrupt vector from its corresponding PHINT register 164. If a vector is stored in the VECBUF 163, then the ADI controller 137 latches this vector into the PHINT 164 and signals another interrupt to the local CPU. The SINTR signal line is then released to allow additional interrupts.

If the operating system needs to reassign interrupts among the CPUs, to prevent an interrupt from occurring during the time when the interrupts are being reassigned, bit 7 of the ICR 162 in the master ADI controller is set to 0. Thus, no master interrupt controller is designated to acknowledge interrupts from the peripheral interrupt controller 144 on the IOSM 108. While no master interrupt controller is assigned, the interrupt assignments between the CPU modules can be switched between CPU modules without losing an interrupt.

Once the interrupts are re-assigned, the master ADI controller is re-enabled.

The ADI control 156 automatically prioritizes interrupts so that the interrupt vector of the highest priority interrupt is presented to the local processor. Preferably, the order of priority in the present embodiment is as follows:
- non-maskable interrupts
- power fail interrupts
- inter-processor interrupts
- hardware interrupts
- local software interrupts The ADI control 156 also automatically inhibits interrupts at the same priority and below the priority of the currently active interrupt. For example, if the operating system is servicing an inter-processor interrupt, then the ADI control 156 temporarily disables hardware and software interrupts in addition to any subsequent inter-processor interrupt. Non-maskable and power failure interrupts would still generate a local interrupt because they are of higher priority than the inter-processor interrupt. The local processor explicitly re-enables the lower level interrupts once it has accepted or processed the pending interrupt. The local processor re-enables lower level interrupts by resetting bit 4 of the ADILCR 158 which restores interrupt enable levels for the local CPU. The state of individual interrupt enables and/or masks of the lower priority interrupt levels are not changed during this operation. This feature is disabled when the local CPU is operating in DOS mode (i.e., interrupts passed directly from system bus to local CPU) by setting bit 3 of the ICR 162 to a 0.

A local non-maskable interrupt (NMI) may be caused by several events as listed below:
- Memory error (parity or an uncorrectable error detected by the error correction code)
- System bus parity error
- CPU parity error
- System bus timeout
- Software generated
- System I/O errors The system I/O error NMI interrupt is only activated in the present embodiment when the ADI controller 137 is operated in the DOS mode (ADI controller 137 is bypassed by setting bit 3 of the ICR 162 to a 0), and I/O errors are not masked with bit 7 of the ADILCR 158. Memory and system bus parity errors are detected in the second clock cycle following the system end-of-transaction signal on the SEOT- signal line. A system bus timeout is signalled if a system bus error occurs coincident with the active signal on the SEOT- signal line. Finally, the restore interrupt enable levels bit (ADILCR 158 bit 4) does not affect NMI interrupts.

As briefly set out above, in addition to automatic distribution of interrupts, each ADI controller provides for generating interrupts under software control with local software interrupts, inter-processor interrupts and software distribution of interrupts.

Local Software Interrupts

Local software interrupts are interrupts generated by the local CPU to interrupt itself. To generate a local software interrupt, the local processor stores an interrupt vector in the LSIV register 230. Thereafter, the local CPU sets bit 0 in the ADILCR 158 which causes the ADI control 156 to activate a signal line 270 which activates the OR gate 242. The active OR gate 242 produces an active signal on the LINTR signal line 243 which generates an interrupt for the local CPU, and the local CPU acknowledges the interrupt. During the interrupt acknowledge cycle, the ADI controller 137 resets bit 0 of the ADILCR 158. At this point, the ADI control 156 generates READY signals for the local CPU and enables the contents of the LSIV register 230 onto the CMD[7..0] data bus 154 as previously explained. The local CPU reads the vector which was stored in the LSIV register 230 and services the interrupt. As previously explained, the interrupt acknowledge cycle from the local CPU is not sent to the system bus 102.

Local software interrupts can be masked explicitly by setting bit 3 in the ADILCR register 158 to a 1, but are also masked if any higher priority interrupts are masked in the IPER0 184 or IPER1 214 (i.e. any bit in these register is set to a 0). The ADI control 156 provides this masking function by sensing the contents of the IPER0 184 and the IPER1 214 registers and only generating software interrupts if no interrupt level is masked by these registers. Software interrupts are masked in this manner because, in the present embodiment, software interrupts are preferably assigned a priority lower than other interrupts.

Inter-Processor Interrupts

The present system also allows processors in the system to interrupt other processors (inter-processor interrupts). The IPIER 238 is the mask register for the inter-processor interrupts. At initialization, or under software control, the IPIER 238 is loaded with the bit assignments for the inter-processor interrupts which are enabled for the corresponding local CPU.

To generate an inter-processor interrupt, a CPU module executes a global write to the IPIR registers 236 in all of the ADI controllers 137. In other words, a CPU module writes to all of the ADI controllers 137 with one write instruction. If any bit set in the IPIR register 236 by the write from the CPU module matches the corresponding bit set in the IPIER register 238, the compare circuit 240 generates an active signal on the signal line 241 to activate the OR gate 242. The active OR gate 242 activates the LINTR signal line 243 and an interrupt is requested for the local processor, as previously explained. The local CPU then reads the interrupt vector, which is enabled onto the data bus from the IPIV 234 during the READY signal sequence, as previously described. Bit 2 of the ICR 162 which controls the function of the SINTR signal line 260 does not effect inter-processor interrupts or local software interrupts.

Software Distribution of Interrupts

Software distribution of interrupts is an alternative to the automatic distribution of hardware interrupts by the ADI controller 137. To enable this mode of operation, bit 1 of the ICR 162 is set to a 1 for all ADI controllers 137 except the interrupt master. This disables hardware interrupts for all ADI controllers 137 except the master.

When the master ADI controller receives a hardware interrupt, the master then determines whether to service the interrupt or to distribute the interrupt to another processor. To transfer the interrupt to another processor, the master ADI controller loads the IPIV registers 234, either globally or individually, with the appropriate interrupt vector. The master ADI controller then sends an inter-processor interrupt to one or more ADI controllers 137 by globally writing to the IPIR registers 236. The contents of the IPIR 236 are compared to the contents of IPIERs 238 in the compare circuit 240 as previously explained. The ADI controller(s) which was interrupted then uses the vector in the IPIV register 234 as if the ADI controller(s) had received the original hardware interrupt from the peripheral interrupt controller 144. In this manner, one ADI controller receives, and re-distributes, interrupts.

For software controlled distribution of interrupts and automatic hardware distribution of interrupts, if multiple ADI controllers are enabled for an interrupt that requires system level action, then the local CPUs use a semaphore or lock, as well understood in the art, to determine which of the CPU modules will handle the interrupt. Essentially, the first CPU to attempt to service the interrupt, as indicated by the semaphore, will service the interrupt.

Although the preferred embodiment of the present invention has been described and illustrated above, those skilled in the art will appreciate that various changes and modifications can be made to the present invention without departing from its spirit. Accordingly, the scope of the present invention is limited only by the scope of the following appended claims.

What is claimed is:

1. An automatic interrupt handling system for use in a multiprocessor computer, said interrupt handling system comprising:
    a multiple processor backplane bus;
    an input/output interface;
    a plurality of input/output devices coupled to said input/output interface;
    a system interrupt controller coupled to said multiprocessor backplane bus and coupled to said input/output interface, said system interrupt controller accepting interrupts for central processing units coupled to said multiple processor backplane bus, said system interrupt controller responsive to said interrupts to signal an interrupt request on said multiple processor backplane bus;
    at least two central processing units installed in said computer on said backplane bus, wherein said central processing units accept at least one interrupt;
    a memory module coupled to said backplane bus having a bus interface which interfaces said memory module with said multiple processor backplane bus such that said memory module is accessible by each of said at least two central processing units;
    at least two local interrupt controllers coupled to said system interrupt controller via said multiple processor backplane bus, a first one of said at least two local interrupt controllers associated with and coupled to a first one of said at least two central processing units, and a second one of said at least two local interrupt controllers associated with and coupled to a second one of said at least two central processing units, said local interrupt controllers comprising an interrupt assigned mask for the associated central processing units, said interrupt assigned mask comprising logic circuitry responsive to said interrupt requests signalled from said system interrupt controller to determine if a signalled interrupt request is a selected interrupt which is enabled for one of said central processing units associated with a selected one of the local interrupt controllers such that the selected one of said local interrupt controllers accepts the selected interrupt and generates a local interrupt for its associated central processing unit, said local interrupt controllers further comprising an interrupt register, wherein said selected one of said local interrupt controllers accepts the selected interrupt and stores an indicator of the interrupt in its interrupt register, the local interrupt controllers further comprising an interrupt response line, said local interrupt controllers acknowledging interrupts to the system interrupt controller for the associated central processing unit; and
    inter-processor interrupt control logic which provides the capability for central processing units in the computer to interrupt, or transfer an interrupt to, other central processing units in the computer.

2. An interrupt handling system for use in a multiprocessor computer with a plurality of central processing units installed in the computer, wherein the central processing units accept interrupts, said interrupt handling system comprising:
    a multiple processor backplane bus;
    a plurality of external input/output controllers which generate external interrupts;
    a system interrupt controller coupled to said multiple processor backplane bus and coupled to said plurality of external input/output controllers via an input/output interface, said system interrupt controller responsive to said external interrupts to signal interrupt requests on said multiple processor backplane bus for said central processing units coupled to said multiple processor backplane bus;
    a memory module coupled to said backplane bus and having a bus interface which interfaces said memory module with said multiple processor backplane bus such that said memory module is accessible by each of said central processing units;
    a plurality of local interrupt distribution controllers, each of said local interrupt distribution controllers associated with and coupled to one of said central processing units, said local interrupt distribution controllers coupled to said system interrupt controller via said multiple processor backplane bus, each of the local interrupt distribution controllers comprising an interrupt assigned mask, said interrupt assigned mask responsive to said interrupt requests signalled from said system interrupt controller to determine if an interrupt request is a selected interrupt which is enabled for a selected one of said central processing units associated with a selected one of said local interrupt distribution controllers, said selected one of said local interrupt distribution controllers further responsive to said selected interrupt to generate a local interrupt for the selected one of said central processing units, said local interrupt distribution controllers further comprising an interrupt register which stores an indicator representing said selected interrupt to provide said indicator to the selected one of said central processing units; and
    inter-processor interrupt control logic which provides the capability for central processing units in the computer to interrupt, or transfer an interrupt to, other central processing units in the computer.

3. A multiprocessor computer wherein a plurality of central processing units are installed in the computer, said computer comprising:
    a multiple processor backplane bus;
    a system interrupt controller which coordinates interrupts for said plurality of central processing units within the system, said system interrupt controller coupled to a plurality of input/output devices via an input/output interface, said system interrupt controller further coupled to said multiple processor backplane bus, said system interrupt controller responsive to interrupt requests from said input/output devices to signal system interrupt requests on said backplane bus;

a memory module having a bus interface which interfaces said memory module with said multiple processor backplane bus such that said memory module is accessible by each of said central processing units;

a plurality of local interrupt controllers coupled to said system interrupt controller via said multiple processor backplane bus, each one of said plurality of local interrupt controllers associated and coupled to at least one of said plurality of central processing units, said local interrupt controllers responsive to said system interrupt requests provided by said system interrupt controller on said backplane bus to compare said interrupt requests to an interrupt assigned mask to determine if a system interrupt request represents a selected interrupt which is enabled for a selected one of the central processing units associated with a selected one of the local interrupt controllers, said local interrupt controllers further comprising interrupt response logic responsive to the receipt of interrupt requests assigned to an associated central processing unit to acknowledge the assigned interrupts to said system interrupt controller; and inter-processor interrupt control logic which provides interface and control logic for central processing units in the computer to interrupt, or transfer an interrupt to, other central processing units in the computer.

4. The multiprocessor computer system of claim 3, wherein one of the local interrupt controllers is selected as a master interrupt controller to acknowledge an interrupt signalled from the system interrupt controller.

5. The multiprocessor computer system of claim 3, wherein the local interrupt controllers further comprise interface and control logic for a central processing unit in the computer to interrupt itself.

6. An interrupt handling system for use in a multiprocessor computer, said multiprocessor computer having at least two central processing units installed in said computer, said central processing units configured to receive interrupts, said interrupt handling system comprising:

a multiple processor backplane bus;

a system interrupt controller coupled to said multiple processor backplane bus and coupled to a plurality of input/output devices via an input/output interface, said system interrupt controller responsive to external interrupts to signal system interrupt requests on said multiple processor backplane bus;

at least two local interrupt distribution controllers coupled to said backplane bus and in communication with said system interrupt controller, a first one of said at least two local interrupt distribution controllers associated with and coupled to a first one of said at least two central processing units, and a second one of said at least two local interrupt distribution controllers associated with and coupled to a second one of said at least two central processing units, said local interrupt distribution controllers having an interrupt assigned mask with detection logic responsive to said system interrupt requests signalled on said backplane bus by said system interrupt controller to compare said system interrupts to said interrupt assigned mask, said comparison indicating whether a system interrupt request is a selected interrupt which is assigned to a selected one of the central processing units associated with a selected one of the local interrupt distribution controllers, said selected one of the local interrupt distribution controllers further responsive to said detection logic to interrupt the selected one of the central processing units and acknowledges said selected interrupt to said system interrupt controller; and inter-processor interrupt control logic which provides the capability for central processing units in the computer to interrupt, or transfer an interrupt to, other central processing units in the computer.

* * * * *